Jan. 12, 1943.  R. PORACCHIA  2,308,230

PURIFICATION DEVICE FOR LIQUIDS

Filed March 25, 1939

INVENTOR:
RAPHAËL PORACCHIA
BY Haseltine, Lake & Co.
ATTORNEYS

Patented Jan. 12, 1943

2,308,230

UNITED STATES PATENT OFFICE 2,308,230

PURIFICATION DEVICE FOR LIQUIDS

Raphaël Poracchia, Paris, France; vested in the Alien Property Custodian

Application March 25, 1939, Serial No. 264,052 In France March 29, 1938

5 Claims. (Cl. 210—18.7)

The present invention relates to purification devices or filters for a liquid, and it is more especially, although not exclusively, concerned with filters of this kind intended to purify the fuel to be fed to internal combustion engines, such devices essentially including a tank including the filtering system and provided with inlet and outlet orifices for the liquid arranged in such manner that the liquid is compelled to flow through the filtering system on its way from the inlet orifice to the outlet orifice.

The object of the present invention is to provide a device of this kind which is better adapted to meet the requirements of practice, and in particular in which the removal of the filtering system, the replacement of said system in position, and the cleaning of the tank, are particularly easy.

According to an essential feature of the present invention, the tank is fitted with a plug, preferably located opposite one of inlet or outlet orifices, this plug including an extension serving to the rectilinear guiding of the filtering system and acting as an abutment for a spring intended to apply this filtering system against the orifice of the tank located opposite this plug.

Preferably, according to the invention, this guiding extension is combined with abutment means respectively carried by said filtering means and said plug and adapted to connect said filtering means with said plug when the latter is being removed, whereby the removal of the plug also produces the disengagement of the filtering means from the tank.

According to another feature of the present invention, these abutment means are constituted by screw threads provided respectively on the one hand on the guiding extension of the plug, and on the other hand on a corresponding extension of the support of the filtering system, these screw threads acting as mere abutments in case of relative rectilinear displacement of the two groups of elements but coming into screwing engagement for rigidly interconnecting said plug and said filtering means in case of relative rotary displacement between them, for instance when the plug is uncrewed.

Other features of the present invention will result from the following detailed description of some specific embodiments thereof.

Preferred embodiments of the present invention will be hereinafter described, with reference to the accompanying drawing, given merely by way of example, and in which.

Figure 1:
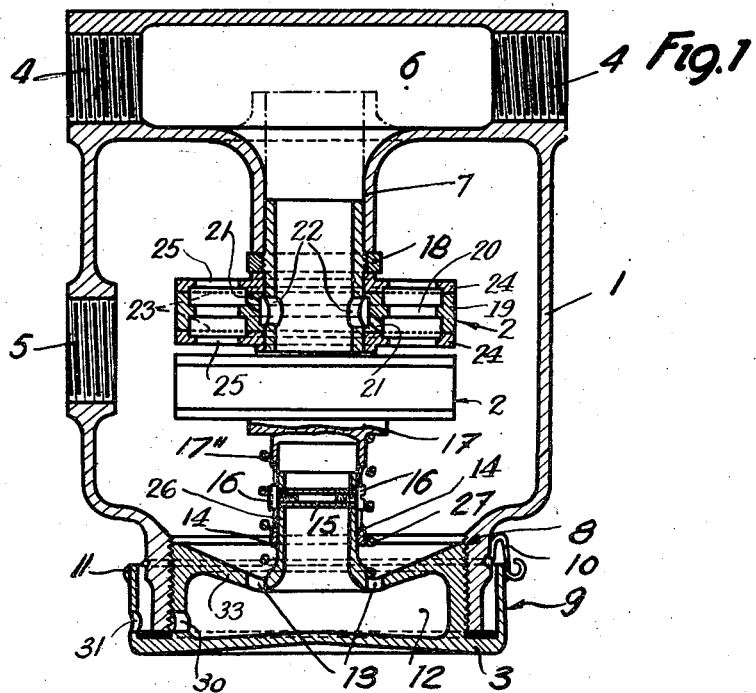
Fig. 1 is an elevational view, in vertical axial section, of a first embodiment of the present invention.

The filtering device for gasoline, as shown by Fig. 1 is essentially constituted by a tank 1, a filtering system 2, and a hollow plug 3 having an inner wall 33.

Tank 1, which may be of any suitable shape, for instance cylindrical, parallelepipedic, spherical, and so on, is provided, at its upper part, with two connections 4, 4, either of which can be fitted on the outlet pipe for the filtered fuel, the other connection being then stopped in the known manner by means of a threaded plug. Tank 1 is further provided, on its lateral wall, with a threaded connection 5, intended to be fitted on the inlet conduit for the fuel to be filtered.

Both of the connections 4 communicate with a chamber 6 opening into the upper part of tank 1, on the inside thereof, through an axial tubular extension 7.

Of course, as shown in dotted lines by the drawing, this tubular element 7 may be adapted to act as direct connection with the fuel outlet conduit, in which case chamber 6 is dispensed with.

Tank 1 is provided, at its lower part with a screw threaded aperture 8 in which plug 3 is screwed. This plug ensures a fluidtight closing of the tank, owing to the provision of a packing ring or the like.

This plug 3 is provided with a milled knob 9, coaxially surrounding it, which permits of readily screwing and unscrewing the plug. Free rotation of this knob is prevented by providing an annular spring 10, secured to the lower part of the tank and engaging in notches 11 existing in the upper edge of said knob 9.

This plug is hollow and constitutes an auxiliary chamber for decantation and separation of the impurities, at 12, said chamber communicating with the inside of tank 1 through apertures 13 of small section piercing the inner wall 33 of said plug. The plug further carries, on the inner wall thereof inside of the tank, a tubular extension 14, coaxial with the outlet tube 7 and in which a hollow pin 15 is transversely mounted. This pin is maintained in position at both of its ends by screws 16 of the head of each of which projects from the outer cylindrical surface of said tubular extension.

The filtering system 2, 2 is constituted by a plurality of filtering chambers carried by a hollow cylindrical support 13, on which they are maintained by a threaded ring 18, the outer face of which is milled, which also ensures the assembly of the various elements of the filtering chambers. Each of these chambers is constituted by rings 19 provided with holes 20 communicating with substantially radial conduits 21 opening into orifices 22 provided in tube 17. On both of the faces of these rings are applied the filtering elements 23 by means of rings 24 perforated at 25.

Tube 17 is, at its upper part, engaged, with a snug fit, in the outlet tube 7. It is closed at 17' and provided, at its lower part, by an extension 17'', slidably mounted on the tubular extension 14 of the plug, its longitudinal guiding being ensured by two elongated slots 26 cooperating with the screw heads 16.

A coil spring 27 is mounted on tubular extensions 17'' and 14, and, bearing upon wall 33 of plug 3, it keeps the filtering system 2 strongly applied against the tubular extension 7 of tank 1.

It follows from this arrangement that the fuel to be filtered which comes in through coupling 5 to chamber 1, passes through orifices 25, filtering elements 23, orifices 20, conduits 21, and tube 17, whence it can flow freely toward couplings 4.

The impurities which drop to the lower part of tank 1 deposit in the auxiliary chamber 12 provided in the plug.

They can be easily evacuated by slightly unscrewing said plug 3, owing to the presence of a hole 30, provided laterally in plug 3, and of a hole 31, provided in the knob 9 of said plug. The unscrewing of plug 3 is made possible by exerting a slight lifting action on one of the ends of steel wire 10, which acts as a brake, in such manner as to disengage said wire from notches 11.

When further unscrewing plug 3, the heads of screws 16 come to bear against the ends of elongated slots 26 and, thus, they drive the filtering system 2, which can then be easily disengaged from the tank when plug 3 is unscrewed completely, without requiring a diameter of the lower orifice of the tank substantially greater than the diameter of rings 19. This result is due to the fact that, owing to the engagement of tubes 17'' and 14 on each other, there is provided, between the plug 3 which is held by the hand and the filtering system a connection in all directions, except in the longitudinal direction, which permits of guiding the passage of the filtering system through the orifice. The resetting in position, and, in particular, the engagement of tube 17 in tube 7 are very easy, for the same reasons.

The separation of the filtering system from the plug can, on the other hand, be ensured by unscrewing screws 16.

Figure 2:
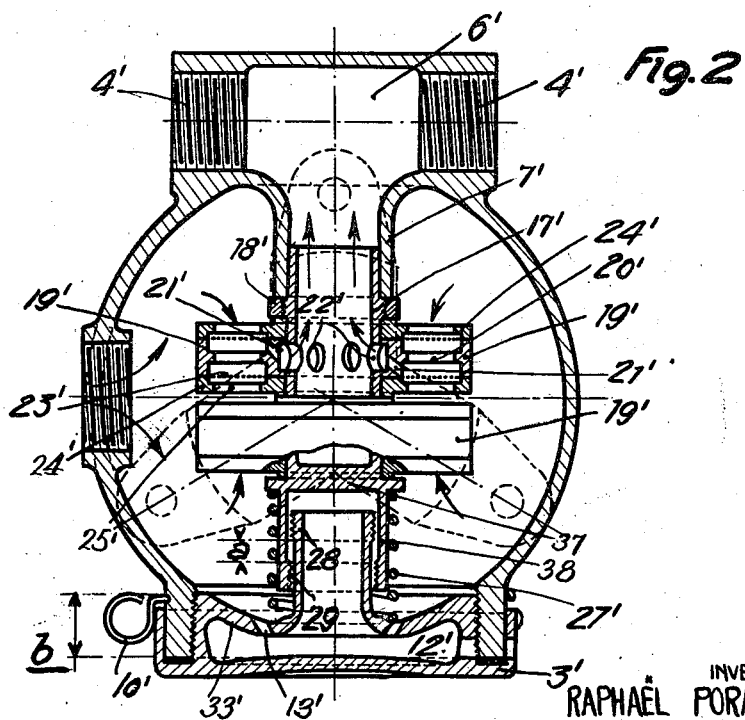
Fig. 2 is a similar sectional view of another embodiment of the invention.

In the modification of Fig. 2, in which the tank 1' has, by way of example, been shown of spherical shape, the assembly of the filtering system with respect to the plug 3' permits a wholly rigid connection between these two elements when the filtering system is to be withdrawn from the tank. It further permits, after its withdrawal, of separating the filtering means from the plug in a much easier manner.

In this figure, the members 1' to 14', 16' through 27', 33', 37 and 38 correspond to members 1 to 14, 16 through 27, 33, 17' and 17'' respectively, in Fig. 1.

The transverse threaded pin 15 of tube 14' has been dispensed with, but this tube is threaded at 28. The end of tube 38 is also provided with screw threads 29 capable of coming into engagement with the first mentioned screw threads 28. In normal position, the whole being in the position illustrated by Fig. 2, these two systems of threads are not in engagement with each other, but the distance $a$ between their ends is smaller than the height $b$ of the screw threaded portion of plug 3'.

It follows that, in normal position, the action of spring 27' is not interfered with and that it can apply the filtering system against tube 7'.

On the contrary when plug 3' has been unscrewed sufficiently (a distance higher than length $a$), the threaded portions 28 and 29 screw into each other, and they ensure a wholly rigid coupling of plug 3' with the filtering system 2', which facilitates the disengagement or the insertion of this system. On the contrary, in order to separate system 2' from plug 3', it will suffice, after removal from the tank, to unscrew the threaded portions 28 and 29 with respect to each other. The re-assembly and fixation in position will be effected in the inverse manner.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. A filtering device of the type described comprising, in combination, filtering means having an open end, a tank adapted to contain said filtering means, a fluid inlet port and a fluid outlet port in the tank, an aperture being provided in the bottom of the tank, having a diameter at least large enough to allow the filtering means to pass through, a plug adapted to close said aperture, and means to hold the filtering means within the tank and coaxial with same, consisting of a tubular extension of the tank, depending from its upper part, a tubular extension of the plug protruding in the tank, and an upper and lower tubular extension of the filtering means, engaging the tubular extensions of the tank and the plug respectively, and elastic means between the plug and the filtering means for urging the latter against the tubular extension of the tank when the plug is screwed.

2. A filtering device of the type described, comprising, in combination, filtering means having an open end, a tank adapted to contain said filtering means, a fluid inlet port and a fluid outlet port in the tank, an aperture being provided in the bottom of the tank, having a diameter at least large enough to allow the filtering means to pass through a hollow plug adapted to close said aperture, forming a settling chamber, holes in the plug to provide a communication between said settling chamber and the inner of the tank, and means for holding the filtering means within the tank and coaxial therewith, consisting of a tubular extension of the tank, depending from its upper portion, a tubular extension of the plug, protruding into the tank and an upper and lower tubular extension of the filtering means, engaging the tubular extensions of the tank and the plug respectively, and elastic means between the plug and the filtering means for urging the latter in place when the plug is screwed, consisting of a spring surrounding the tubular extension of the plug and the lower tubular extension of the filtering means, and a threaded washer interposed between the filtering means and the tubular extension of the tank.

3. A filtering device of the type described, comprising, in combination, a filtering means having an open circular outlet port, a tank adapted to contain said filtering means, a fluid inlet port and a fluid outlet port in the tank, an aperture being provided in the bottom of the tank, having a diameter at least large enough to allow the filtering means of passing through, a hollow plug adapted to close said aperture and forming a settling chamber for the fluid, tubular extensions carried by the tank and the filtering means for rigidly coupling in a fluid tight manner the outlet orifice of the tank with the open outlet port of the filtering means, a tubular extension carried by the plug on the inner side thereof, a tubular extension of the filtering means, in line with the first mentioned tubular extension thereof, slidably guided by said tubular extension of the plug, and means carried by the tubular extension of the plug and the second mentioned tubular extension of the filtering means, for limiting the longitudinal and coaxial displacement of the last mentioned elements with respect to each other.

4. A filtering device according to claim 3, in which the means for limiting the longitudinal and coaxial displacement consist of elongated longitudinal slots in the second tubular extension of the filtering means, cooperating with a transverse pin carried by said tubular extension of the plug, and the ends of which engage said elongated slots.

5. A filtering device according to claim 3, in which the respective ends of the second mentioned tubular extension of the filtering means and of the tubular extension of the plug are provided with screw threads adapted so as to be out of screwing engagement when said plug is screwed in the tank, but to come into screwing engagement with each other when said plug is at least partly removed from the first mentioned aperture to ensure the rigid connection of said plug with the filtering means.

RAPHAËL PORACCHIA.